UNITED STATES PATENT OFFICE.

ANDREW A. DUNHAM, OF BAINBRIDGE, NEW YORK, ASSIGNOR TO THE CASEIN MANUFACTURING COMPANY, A CORPORATION OF VERMONT.

ART OF PREPARING CASEIN GLUES.

1,391,770.  Specification of Letters Patent.  Patented Sept. 27, 1921.

No Drawing.  Application filed August 8, 1919.  Serial No. 316,184.

*To all whom it may concern:*

Be it known that I, ANDREW A. DUNHAM, a citizen of the United States, residing at Bainbridge, in the county of Chenango and State of New York, have invented or discovered certain new and useful Improvements in the Art of Preparing Casein Glues, of which the following is a specification.

My present invention relates more especially to an improvement in the invention or discovery covered by my co-pending application, No. 222,961. The purpose of the present invention or discovery is to produce a combined waterproof casein glue or cement which may be packed and shipped to the consumer in dry condition with all ingredients mixed and ready for use by dissolving the same in the required amount of water.

In preparing a combined waterproof casein glue, there is some objection to the use of the caustic alkalis, as sodium hydroxid or potassium hydroxid inasmuch as these caustic alkalis have a deleterious effect upon the casein upon long storing, due to a small percentage of moisture naturally contained in the mixture. I therefore prefer to use some other alkali which accomplishes the same results and produces a casein glue or cement which, when dissolved in the required quantity of water, produces a glue capable of withstanding moisture.

In the preparation of this waterproof glue or cement composition I preferably take about 70 parts of a good grade of commercial casein, about 10 parts of sodium phosphate, and about 20 parts of calcium hydroxid, all in dry condition. I prefer to have this material ground to pass through a 40 mesh screen and thoroughly and completely mixed together. This glue mixture may be placed on the market in dry condition and the method of using the same is as follows: In a mixer place 20 pounds of cold water, to this water add 10 pounds of the waterproof casein glue or cement mixture and agitate for a period of twenty minutes, or until a perfect solution of the casein is formed; the glue is then ready for use in the regular manner and may be applied either by glue spreading machines, well known in the art, or by means of hand brushes as desired.

A glue made up according to the formula mentioned has great strength, and veneers or other pieces of wood glued together with it withstand the action of cold water for a long period of time, and even withstand the action of boiling water for twenty-four hours or more.

It is understood that I do not wish to limit myself to the proportions of the ingredients as above stated, as the quantity of the alkali used in dissolving the casein may be varied according to the quality of the casein used; furthermore, the proportion of calcium hydroxid may be varied according to the results desired. Neither do I wish to limit myself to the use of sodium phosphate, as any alkali which has the property of completely dissolving casein and producing by the above formula a waterproof casein glue may be used. Neither do I wish to limit myself to the use of calcium hydroxid, as any of the alkaline earth-hydroxids having the property of combining with the other ingredients to produce a waterproof glue or cement are suitable for the purpose.

Having thus described my invention or discovery I claim and desire to secure by Letters Patent:

1. A casein glue preparation or composition consisting of about 70 parts of casein, about 10 parts of sodium phosphate, and about 20 parts of an alkaline earth hydroxid, all in dry comminuted form and thoroughly mixed together.

2. A casein glue preparation or composition consisting of about 70 parts of casein, about 10 parts sodium phosphate and about 20 parts of calcium hydroxid, all in dry comminuted form and thoroughly mixed together.

In testimony whereof I affix my signature.

ANDREW A. DUNHAM.